Sept. 30, 1958        J. N. APGAR        2,854,253

TURNTABLE FOR FIFTH WHEEL TRAILER COUPLINGS

Filed June 20, 1957        2 Sheets-Sheet 1

INVENTOR

John N. Apgar

BY *Pierce, Scheffler & Parker*

ATTORNEYS

Sept. 30, 1958
J. N. APGAR
2,854,253
TURNTABLE FOR FIFTH WHEEL TRAILER COUPLINGS
Filed June 20, 1957
2 Sheets-Sheet 2
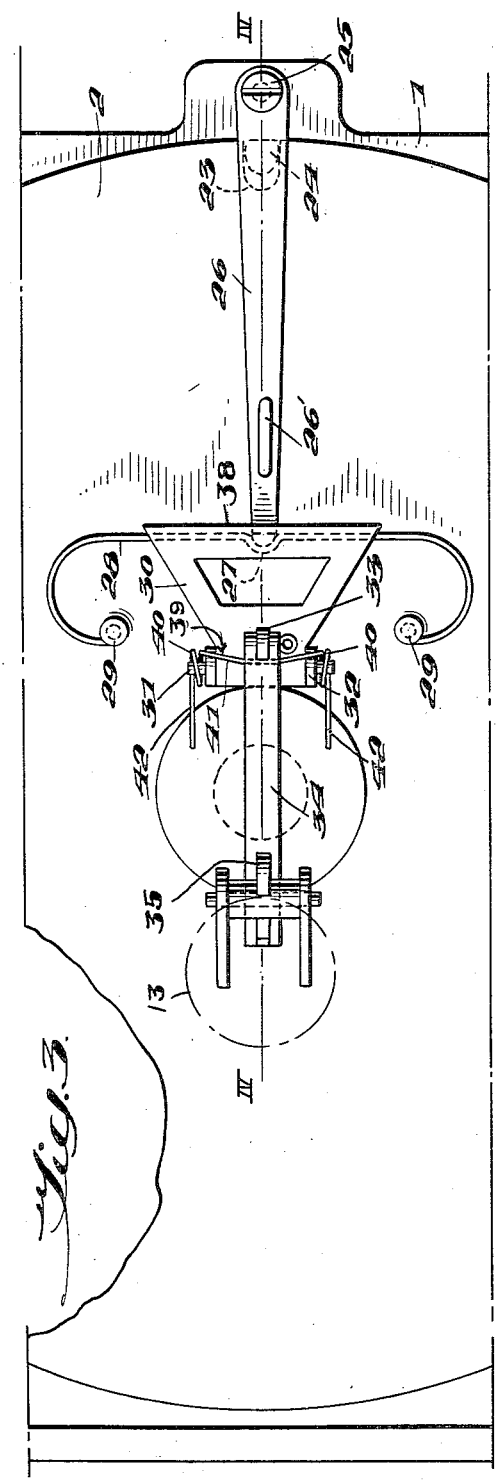
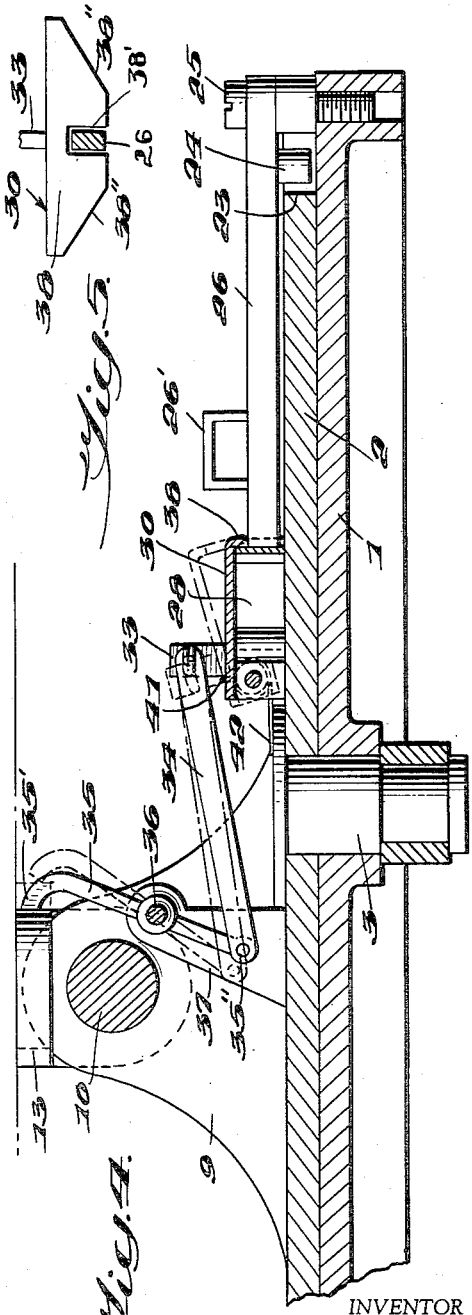
INVENTOR
John N. Apgar
BY Pierce, Scheffler & Parker
ATTORNEYS

United States Patent Office 2,854,253
Patented Sept. 30, 1958

2,854,253

TURNTABLE FOR FIFTH WHEEL TRAILER COUPLINGS

John N. Apgar, Bound Brook, N. J.

Application June 20, 1957, Serial No. 666,842

3 Claims. (Cl. 280—438)

This invention relates to turntables for supporting the tractor carried elements of a fifth wheel coupling for tractor-semitrailer assemblies, and more particularly to a novel mechanism for preventing relative movement of the turntable plates when the tractor carried elements are coupled to the complementary elements on the semitrailer.

The turntable plates of a fifth wheel coupling such as described in my prior Patent No. 2,501,884, granted March 28, 1950, must be locked against angular movement when a tractor equipped with a turntable is to be employed with a semitrailer having a fifth wheel plate which is not provided with slots for receiving locking keys carried by the lower fifth wheel plate on the tractor. It is also desirable to lock the turntable plates against relative movement during the coupling operation of a tractor to a semitrailer which has a slotted fifth wheel plate.

If the turntable plates are not locked during the coupling operation, the forked lower plate of the fifth wheel may be turned into a position which makes it impossible to complete the coupling should a side edge of the forked opening strike the king pin of the semitrailer unit. The turntable lock must also be released when the latching keys of the lower fifth wheel plate on the tractor enter slots in the upper fifth wheel plate on the semitrailer to lock the lower and upper fifth wheel plates to each other.

In my prior Patent No. 2,501,884, the locking and unlocking mechanism for the turntable plates provides a positive lock for the turntable plates during the major portion of the semitrailer pick-up operation, the positive lock then being converted to an impositive latch between the turntable plates at the close of the pick-up or coupling operation between the tractor and semitrailer. After the coupling has been completed, subsequent movement of the tractor drawing the semitrailer then brings about an automatic release of the impositive latch so that the turntable plates are then free to turn relative to each other. More particularly, the turntable and locking mechanism therefor in accordance with said patent includes an impositive latch, a keeper for preventing release of the impositive latch and mechanism operative during the final stage of the coupling operation between the tractor and semitrailer to move the keeper into an inoperative position.

While the arrangement according to my previous patent is generally advantageous, it does suffer from one disadvantage in that the keeper element must be set by hand to its operative position each time the impositive latch is actuated to interconnect the turntable plates together so that there will be no relative rotational displacement between them. Should the operator fail to set the keeper element and thus effectively bring about a positive lock there will be only the impositive latch between the turntable plates holding the latter against relative rotation. However, since the latch is impositive in its nature and can be thrown out by a slight torque applied to the lower fifth wheel plate with which the upper turntable plate rotates as a unit, it thus follows that should a side edge of the forked opening in the lower fifth wheel plate strike against the king pin of the semitrailer unit, the resulting torque applied to the lower fifth wheel plate and hence also the upper turntable plate will effect release of the impositive latch causing the lower fifth wheel plate on the tractor to turn to a position making it impossible to complete the coupling.

The object of the present invention is to provide an improved arrangement for the keeper element of the impositive latch by which the keeper element is not only moved to its inoperative position during the final stage of the coupling operation between tractor and trailer but which also is always spring loaded to its operative position thus always assuring a positive lock of the impositive latch each time the latter is set prior to a coupling operation.

A more particular object of the invention is to provide a locking arrangement for the turntable plates of the fifth wheel comprising a deep notch in the forward edge of the upper turntable plate and a cooperating lug movable about a pin mounted at the forward edge of the lower turntable plate, the locking lug being integral with and lying below the pivoted end of a latching lever which extends radially over the upper turntable plate when the plates are latched together to seat in a notch at the center of a C-spring secured to the upper turntable plate. This constitutes the impositive latching means between the turntable plates, and this impositive latching means is convertible into a positive lock between the plates by means of a spring-loaded keeper member pivotally mounted on the upper turntable plate and which is always loaded to the position engaging that end of the latching lever whenever the latter engages in the notch in the C-spring. When so engaged, the latching lever cannot be moved out of its position and hence it becomes impossible for the locking lug integral with this lever to be moved out of the notch in the upper turntable plate so as to release the plates for relative rotational movement. However, during the final phase of the coupling operation between the tractor and semitrailer, the king pin on the semitrailer causes the keeper member to be lifted out of engagement with the end of the latching lever thus converting the positive lock into an impositive latching means that releases after the coupling has been completed and there is relative rotation between the tractor and semitrailer at the fifth wheel assembly.

These and other objects and advantages of the invention will become more apparent from the following specification when considered with the accompanying drawing in which:

Fig. 3 is an enlarged plan view of a portion of the turntable showing the details of the positive and impositive latching means for the turntable;

Fig. 4 is a vertical central longitudinal section taken on line IV—IV of Fig. 3; and Fig. 5 is a fragmentary view showing the positive latching plate for the lever which controls the impositive latching means.

Figure 1:
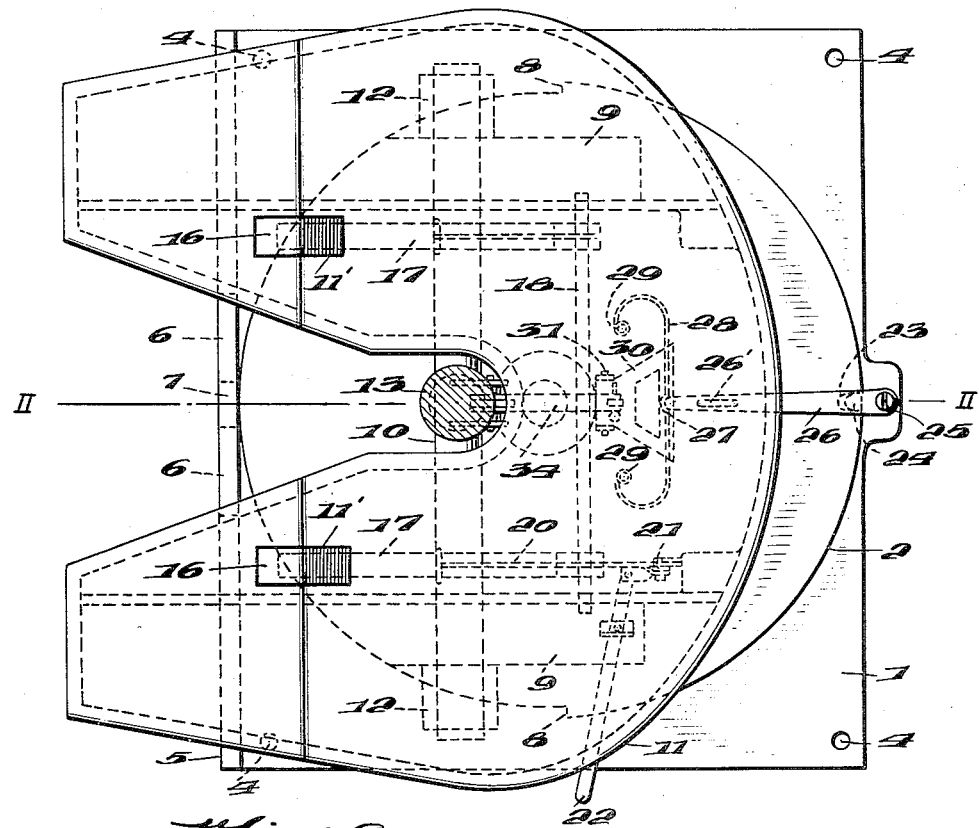
Fig. 1 is a plan view of the tractor-carried elements of a turntable fifth wheel coupling embodying the invention.
Figure 2:
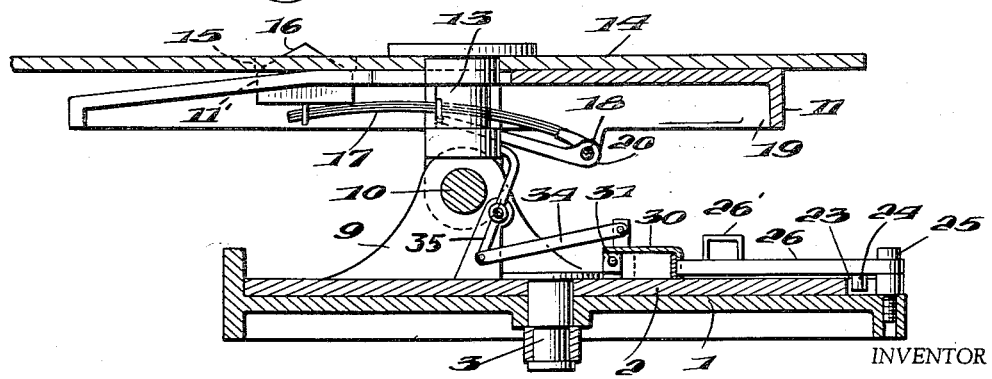
Fig. 2 is a vertical central longitudinal section taken on line II—II of Fig. 1.

In the drawings, the reference numerals 1 and 2 identify a lower and an upper plate, respectively, which are in surface contact and pivotally connected by a pivot pin 3 to form a turntable. The lower plate 1 is preferably of rectangular shape and provided with openings 4 adjacent the corners for receiving clamping bolts, not shown, by which the turntable may be rigidly mounted upon a tractor. The upper turntable plate 2 is approximately circular, but with its rearward one-half of somewhat smaller radius than the forward section to clear a reinforcing and stop flange 5 which extends upwardly along the rear edge of the lower turntable plate 1. Openings 6, 6 are cut in the flange 5 at opposite sides of the longitudinal axis of the plate 1 so as to leave an integral stop rib 7, the openings being of such size that the radial flanges 8, 8 at the junction of the different radius sections of the plate 2 may enter the openings to engage the stop rib 7, thereby limiting the turning movement of the tractor to about 90° with respect to the longitudinal axis of the coupled trailer.

Trunnions 9 are mounted on the turntable plate 2 to support a rock shaft 10 with its axis spaced slightly to the rear of the turntable pivot pin 3, and the lower plate 11 of a fifth-wheel coupling is journalled on the rock shaft 10 by trunnions 12. The fifth wheel plate is of conventional forked or yoke type for receiving the king pin 13 of the cooperating fifth-wheel plate 14 which is carried by a semitrailer. An automatic or semi-automatic type of clutch, not shown here but which is illustrated in my previous Patent No. 2,501,884, is mounted on the lower face of plate 11 for locking engagement with the king pin.

Latch keys 16 for locking engagement in openings 15 of the upper fifth wheel plate 14 on the semitrailer are carried by the rear ends of leaf springs 17 which are mounted at their front ends for rotation about a transverse rod or shaft 18 extending parallel with rock shaft 10 and journalled in openings in reinforcing ribs 19 at the lower face of the fifth-wheel plate 11 of the tractor, and the key ends of the leaf springs may be turned towards and away from the apertures 11' in plate 11 by means of a link 20 for each spring, each link being connected at one end to an intermediate point on one of the leaf springs and secured rigidly at the other end to shaft 18. A toggle mechanism 21 which is actuated by a pivotally mounted handle 22 is associated with an extension on one of the links to actuate the same pivotally about the axis of shaft 18 thus causing this link as well as the other link to actuate the springs. The details of this portion of the mechanism are more particularly described and claimed in a co-pending application Serial No. 669,746 filed July 3, 1957.

The turntable plates 1 and 2 must be locked against relative rotational movement when a tractor is to be backed to couple itself to a parked semi-trailer unit thereby to retain the rock shaft 10 parallel to the tractor axles. The locking elements include a deep notch 23 in the forward edge of the upper turntable plate 2, and a cooperating lug 24 which is movable angularly about a pin 25 mounted at the forward edge of the lower turntable plate 1, the locking lug being integral with and lying below the pivoted end of a longer latching lever 26 which preferably is provided with an eye 26' in which a hooked rod may be engaged for shifting this lever.

Lever 26 extends radially over the plate 2, when the plates 1, 2 are latched together, to seat in a central semicircular bend or recess 27 of a C-shaped leaf spring 28 whose ends are secured to the turntable plate 2 by bolts 29.

A keeper 30 in the form of a generally trapezoidal shaped plate is pivotally mounted for rotation about a horizontal transversely extending shaft 31 parallel to rock shaft 10, the shaft 31 being supported in apertured spaced lugs 32 upstanding upon the upper face of plate 2. Keeper 30 includes an upstanding integral arm 33 which is connected by a link 34 to the lower end 35'' of a rocking lever 35 journalled for rotation intermediate its ends about a shaft 36 parallel with shafts 10 and 31, and which is supported in spaced trunnions 37 also upstanding upon the upper face of plate 2. The rocking lever 35 is located centrally of the rock shaft 10 so as to position the upper end 35' in the path of the king pin 13 on the semitrailer during relative movement of the fifth-wheel plates 11 and 14 when the tractor unit is backed towards a parked semitrailer unit to couple to the latter.

The forward edge of keeper 30 includes a depending flange 38 which as is clearly shown in Figs. 4 and 5 operates in front of the middle, substantially straight portion of the C-shaped spring 28 and includes a notched portion 38' which engages that end of lever 26 which seats in the central recess 27 of spring 28 thus providing a positive lock for lever 26 and hence preventing release of this lever from spring 28 by a flexing of the same. As seen in Fig. 5, the side portions of the flange 38 are inclined upwardly at 38'' so as to permit the lever 26 to raise the keeper 30 and move into the notch 38' as the lever 26 is rotated into position to bring the rear free end into the recess 27 in spring 28. The principal feature of the invention is that the keeper 30 is always spring loaded to the position shown in full lines in Fig. 4. To effect this function, a spring member 39 is provided. This spring includes two looped portions 40 which fit upon the opposite protruding ends of shaft 31, a central, substantially straight portion 41 which bears against the rear edge of the arm 33 and two horizontally extending end portions 42 which rest upon the flange of pivot pin 3. The forces created in the spring member 39 by such an arrangement is thus always to bias the keeper 30 for rotation clockwise about its pivot shaft 31 so that the notch 38' in flange 38 is engaged with the end of lever 26.

The rocking lever 35 is so dimensioned and located that the upper end 35' is engaged by the king pin 13 only during the final movement, for example, during the last inch or inch-and-a-half of relative movement of the fifth-wheel plates 11 and 14 into fully coupled position. In other words, the king pin 13 engages the end 35' of lever 35 to move the keeper 30 into inoperative position, as indicated by the broken lines in Fig. 4 only when the coupling of the fifth-wheel plates 11 and 14 is substantially complete. The previous positive locking of the plates 1 and 2 to each other is thus converted to an impositive latching therebetween by the movement of keeper 30 into its raised, inoperative position, but any side pressure thereafter exerted upon an edge of the forked recess of the lower turntable plate 11 by the king pin 13 is of too low an order to effect release of the impositive latching of arm 26 to the C-spring 28.

When the coupled tractor and semitrailer assembly unit is moved forward to aline the longitudinal axes of the tractor and semitrailer units, the latch keys 16 will enter the cooperating slots in the upper fifth-wheel plate 14 to lock the fifth-wheel plates to each other, and when the assembly next moves along a curved path, the turning of the tractor with respect to the semitrailer results in an automatic release of the impositive latching of the turntable plates 1 and 2 due to the flexing of the C-spring 28. The release of the turntable is thus effected without any special action by the driver, but an inadvertent release of the turntable by shock forces during the hook-up is prevented since the turntable plates are positively locked to each other throughout all but the final stage of the hook-up of the tractor and semitrailer units.

In my previous Patent No. 2,501,884 where a somewhat similar arrangement of positive locking and impositive latching means is provided for the plates 1 and 2 which constitute the turntable, the keeper member which serves to lock the lever 26 against displacement bears against the inner face of the central portion of the C-spring to prevent the latter from yielding thus effectively locking the end of the lever 26 against movement out of the spring recess. Because of that it is not practical to load the keeper by spring means or the equivalent into the positive locking position against the inner face of the C-spring before a hook-up is to be made since it would then be impossible for the driver to rotate the free end of lever 26 into the recess in the C-spring. Thus, with the arrangement shown in my previous patent, it was necessary for the driver to make certain that the keeper was shifted by hand into the positive locking position behind the C-spring after the end of lever 26 had been moved into the recess in the C-spring. Should, however, the driver forget to do this, the positive lock for the turn table plates 1 and 2 would not be effected and hence as the tractor was backed to the semitrailer, the impositive latch could easily become released and thus permit the lower fifth-wheel plate 11 and rock shaft 10 to rotate and prevent coupling should the pin 13 of the semitrailer unit strike against the edges of the forked opening in the plate 11.

With the present improvement, however, wherein the keeper 30 engages the free end of lever 26 directly, the keeper can always be biased to its positive locking position and the driver can easily rotate the lever 26 into the recess 27 in the C-spring 28, the lever 26 merely riding against one or the other of the inclined sides 38'' of the flange 38 and raising the same against the counter biasing action of the spring 39 until the end of lever 26 enters the notch 38' in the flange 38 simultaneously with entering the recess 27 in spring 28 whereupon the flange 38 is then automatically lowered to the positive locking position on the lever 26 by the action of spring 39.

I claim:

1. In a tractor-semitrailer coupling, a pair of superposed and pivotally connected lower and upper turntable plates for mounting upon a tractor, a forked fifth-wheel plate for cooperation with a fifth-wheel plate to be mounted on a semitrailer unit, means for supporting said forked fifth-wheel plate for rocking movement upon the turntable, means including a latching lever for impositively latching said turntable plates to each other with the rocking axis of the fifth wheel plate transverse to the longitudinal axis of the tractor, a keeper for said latching lever, spring means loading said keeper into positive and automatic engagement with said latching lever as said lever is moved to latched position thereby to prevent movement thereof in the release direction and thereby to convert said impositive latching means to a positive lock, and release means operative during the final movement of said fifth wheel plates into coupling position to disengage said keeper from said latching lever against the counter force exerted by said spring loading means.

2. In a tractor-semitrailer coupling, the invention as defined in claim 1 wherein said impositive latching means includes a latching lever having one end thereof engaged in a recess in a C-spring secured to said upper turntable plate and wherein said keeper includes a pivotal member mounted on said upper turntable plate and engageable with that end of said latching lever which is engageable with the recess in said C-spring.

3. In a tractor-semitrailer coupling, the invention as defined in claim 2 wherein said keeper member pivotally mounted on said upper turntable plate includes a vertical flange portion containing a notch which is engageable with said latching lever, said flange portion being inclined upwardly from each side of said notch thereby to permit said latching lever to cam against the same and raise it against the counter action of said loading spring during movement of said latching lever to the position engaging the recess in said C-spring.

References Cited in the file of this patent

UNITED STATES PATENTS 2,501,884     Apgar _____ Mar. 28, 1950